United States Patent [19]
Delplanque et al.

[11] 3,868,645
[45] Feb. 25, 1975

[54] APPARATUS FOR AUTOMATICALLY FINDING MICRODOCUMENTS ON A FILM

[76] Inventors: Jean Delplanque, Vayres-sur-Essone; Jacques Foursy, Villejuif, both of France

[22] Filed: July 10, 1972

[21] Appl. No.: 270,258

[30] Foreign Application Priority Data

Sept. 13, 1971 France .............................. 7132965

[52] U.S. Cl..................... 340/172.5, 353/25, 353/26
[51] Int. Cl........................... G06f 7/22, G03b 23/12
[58] Field of Search .............. 340/172.5; 353/25, 26, 353/27

[56] References Cited

UNITED STATES PATENTS

| | | | |
|---|---|---|---|
| 3,036,291 | 5/1962 | Whittle et al. | 340/172.5 |
| 2,652,196 | 9/1953 | Sterling | 340/174.1 C |
| 2,901,734 | 8/1959 | Welsh et al. | 340/174.1 C |
| 3,107,343 | 10/1963 | Poole | 340/172.5 |
| 3,325,786 | 6/1967 | Shashoua et al. | 340/172.5 |
| 3,585,597 | 6/1971 | Holmerud | 340/172.5 |
| 3,700,320 | 10/1972 | Brewer et al. | 353/26 |

*Primary Examiner*—Gareth D. Shaw
*Attorney, Agent, or Firm*—Marn & Jangarathis

[57] ABSTRACT

An apparatus for automatically finding microdocuments on a film comprises a film reader having a pick-up to provide signals defining the position of microdocuments on a film, a magnetic tape recorder for recording those signals together with corresponding addresses for the microdocuments, and logic units enabling a predetermined address on the tape to be located and the corresponding position signal to be read out and utilised to control the film reader to find the microdocument having the position represented by the signal read out.

23 Claims, 1 Drawing Figure

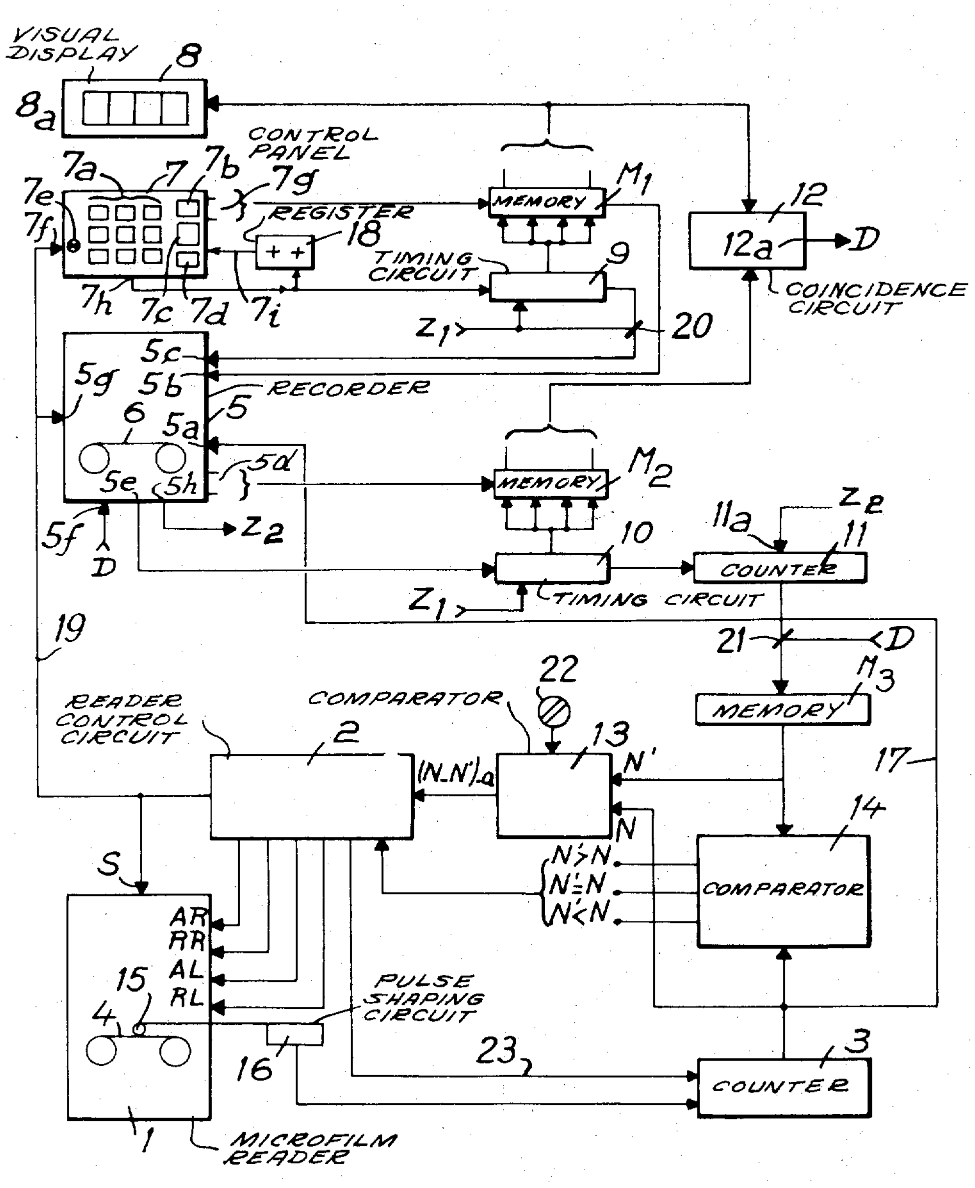
VISUAL DISPLAY
8
8a
CONTROL PANEL
7a 7 7b 7g
7e
7f
REGISTER
18
MEMORY
M1
12
12a
D
TIMING CIRCUIT
9
COINCIDENCE CIRCUIT
7h 7c 7d 7i
Z1
20
5c
5b
5g
RECORDER
5
6
5a
5d
5e 5h
MEMORY
M2
5f
D
Z2
Z2
11a
11
10
COUNTER
Z1
TIMING CIRCUIT
19
21
D
M3
MEMORY
READER CONTROL CIRCUIT
COMPARATOR
22
2
13
N'
(N-N')o
17
N
14
S
N'>N
N'=N
N'<N
COMPARATOR
AR
RR
AL
RL
15
4
PULSE SHAPING CIRCUIT
16
23
3
COUNTER
1
MICROFILM READER

APPARATUS FOR AUTOMATICALLY FINDING MICRODOCUMENTS ON A FILM

BACKGROUND OF THE INVENTION

The present invention relates to apparatus for automatically finding microdocuments on a film.

Microfilming affords undisputed advantages and provides a solution to the problem of reducing the volume of all records and all documents. It has now become apparent that the simplest and most rational way of storing microcopies, both from the viewpoint of safety, rapidity and volume and from the viewpoint of obtaining copies, is storage on reels. Accordingly, equipment is required for automatically finding a microdocument stored on a reel of film. At present, almost all automatic finding methods are based on optical reading techniques. To this end, optical coding data is recorded on the sensitive photographic surface at the same time as the corresponding document is photographed by the use of specialised equipment. On the one hand, this method slows down the rate of photographing, while on the other hand the checking of the recorded coding is uncertain. In any case, the coding is substantially permanent, and cannot easily be amended or added to. Moreover, this form of coding is very costly.

SUMMARY OF THE INVENTION

Of the various media for recording the coding, the magnetic recording medium has been chosen in accordance with the present invention.

In accordance with one aspect of the invention, each microdocument is given an alphanumerical designation which is previously recorded on a magnetic recording medium, such as tape, simultaneously with a number of electric pulses emitted by a pick-up in step with the unwinding of the film, means being provided to ensure correspondence between the pulses indicating the position, rank or order of the microdocument and its alphanumerical designation as applied to the magnetic recording medium.

According to another aspect of the invention, there is provided an apparatus for locating frames of a film, the apparatus comprising:

a film reader having means for driving a film;

sensing means for sensing the position of said frames of said film as said film is driven;

a magnetic recording reader adapted to receive a magnetic recording medium having recorded on it a plurality of words corresponding to respective one of said frames to be located;

searching means for searching said medium in said magnetic recording reader to find a word corresponding to a frame to be located; and means for stopping the driving means of said film when said sensing means senses a position corresponding to the location of said word found in said magnetic recording reader. In a preferred embodiment of the apparatus, the medium also has recorded on it data defining the position of said frames identified by said words recorded on said medium, the apparatus comprising comparison means for comparing that position data read from said medium which corresponds to said word found by said searching means with the frame position as sensed by said sensing means and for operating said stopping means when correspondence between the positions is sensed.

Magnetic tapes are a suitable medium as they are of small volume as compared with other recording media, and they involve the use of uniform technologies both for recording and for reading. In addition, they can have relatively high speeds of travel and employ interpretation equipment which has already been technically developed and disclosed.

DESCRIPTION OF DRAWINGS

For a better understanding of the invention and to show how the same may be carried into effect, reference will now be made, by way of example, to the accompanying drawing, in which the single FIGURE is a block diagram of an apparatus designed to record and automatically locate the position of microdocuments or frames on a film by means of alphanumeric characters associated with respective ones of the microdocuments or frames of the film.

The apparatus comprises a microfilm reader 1 and a magnetic cassette recorder 5 coupled by various control and logic units to be described hereinafter.

The reader 1 is a conventional reader shown diagrammatically as containing a film 4. Associated with the film is a pick-up 15 comprising a member in contact with the film to produce a predetermined number of pulses for each increment of movement of the film 4 by one frame in either direction. The output of the pick-up 15 is connected by a shaping circuit 16 to a forward-backward counter 3.

The reader 1 has two forward and two reverse speeds determined by signals at corresponding inputs AR, AL, RR and RL, these signals being produced by a reader control circuit 2 as will be described hereinafter.

The reader 1 is also coupled to the circuit 2 by an input S, a signal at which causes the movement of the film 4 to cease.

The cassette recorder 5, of basically conventional construction, is shown diagrammatically to contain magnetic tape 6 to record in digital code the addresses of microdocuments in their order of filming and the number of pulses as represented by the count in counter 3, and to enable one to read the recorded data to find the position or order of a particular microdocument on the film 4.

The recorder 5 has an input **5*a* to receive the data to be recorded from counter 3, and an input 5*b* to receive address data also to be recorded in response to a sampling pulse received at an input 5*c*. The recorded addresses read from the tape 6 are emitted at outputs 5*d* and the pulses representing the positions of the frames are read out at output 5*e*. An input 5*f* is provided to receive a pulse D to stop the drive of the tape 6 and an input 5*g* is provided to receive a signal on line 19 to cause fast rewind. Completion of rewind initiates the emission of a pulse $Z_2$ at an output 5*h*.**

The recorder 5 is associated with a control panel 7 having an alphanumeric keyboard **7*a* and a column of instruction keys 7*b*, 7*c* and 7*d* for giving instructions to the recorder 5.**

Key **7*b* sets up a write or recording mode, key 7*c* sets up a rewind mode in which the tape 6 is rewound by the recorded length of one address, and key 7*d* sets up a searching mode of the recorder 5 in which the recorder 5 operates as a tape reader. The control panel 7 also has an indicator lamp 7*e* which lights up at the conslusion of a search and an input 7*f* to receive a signal from the control circuit 2 on line 19 to cause energisation of the lamp 7e. An encoder is also contained in the control panel but it is not shown as it may be entirely conventional, having the function of converting signals denoting the operation of respective keys of the keyboard 7a into respective digital words emitted at data outputs 7g. A further output 7h exists to carry a sampling pulse produced each time a key of the keyboard 7a is depressed. These pulses are fed to a four-bit register 18 which supplies a signal at an input 7i when four keys of the keyboard have been depressed. This signal at input 7i effectively locks the keyboard to prevent data from being emitted at outputs 7g** when four keys have been depressed. This assumes, according to the present example, that each address has four characters.

A visual display panel 8 is also associated with the control panel 7 and comprises a number of display tubes 8a for the display of the alphanumeric characters used by the apparatus.

The elements described so far are coupled to each other by an electronic logic unit which comprises conventional logic elements which are a digital memory M1 and associated timing circuit 9 connected to receive pulses from outputs 7g of the control panel 7, a digital memory M2 and associated timing circuit 10 connected to receive pulses from the outputs 5d and 5e of the recorder 5, and a coincidence circuit 12 connected to receive data from both memories M1 and M2. The timing circuits are controlled by timing pulses $Z_1$ which, in the case of circuit 9, operate a gating arrangment 20 to allow the sampling pulses to pass to the recorder input 5c. The timing circuit 10 is connected to feed a position counter 11 which itself feeds a digital memory $M_3$. The counter 11 has a reset input 11a connected to the output 5h for signal $Z_2$ from the recorder 5.

The memory M3 is connected to a digital comparator 13 and to a digital comparator 14, which are in turn connected to receive data from the forward-and-backward counter 3.

For introducing data onto the magnetic tape 6, the operator depresses the writing key 7b, which has the effect of bringing the magnetic recorder 5 into the recording mode and of cancelling the locking of the keyboard by the register 18.

At the keyboard 7a, the operator then depresses the first alphanumerical character of an address and the binary bits of that character are emitted by the outputs 7g and are stored in a first stage of the memory M1. These bits are also fed to the write input 5b of the recorder 5. The depression of a key of the keyboard also causes the sampling pulse to emanate from the keyboard at output 7h to bring about on the one hand the recording of the character via input 5c and on the other hand the advance of the memory M1 by one step to prepare it for receipt of the next character.

The process is the same for the succeeding three characters of an address.

The four bit register 18 locks the keyboard 7a after a fourth character of a series has been introduced, so that if, erroneously, a fifth key of keyboard 7a were depressed, it would have no effect.

In order to write a further word of four characters, it is sufficient to actuate the writing key 7b again.

If it is desired to modify a word which has already been recorded on the tape 6, it is desirable first of all to find this word and thereafter to depress the rewriting key 7c of the panel 7. The recorder thus moves back by four characters, i.e. one word, and erases this word. It is then sufficient to depress the correct four keys of the keyboard 7a to introduce the correct address. The introduced address is also visually displayed by the display panel 8.

During the recording of the alphanumerical characters, the microfilm is unwinding and the electric pulses, which are emitted by the pick-up 15 through the forward-and-backward counter 3 and the conductor 17 to the magnetic recorder 5, are also recorded on the same magnetic tape 6 so as to ensure correspondence between the alphanumeric address and the position of the document on the microfilm 4.

In order to find a microdocument from an alphanumerical address or designation recorded on the tape 6, the operator depresses key 7d to set the reading mode of the recorder and then depresses the appropriate keys of the keyboard 7a. This address is then introduced into the memory M1 under control of timing circuit 9, itself controlled by the timing pulses $Z_1$, and is also displayed by the display panel 8. The magnetic recorder 5 then enters the reading phase in which its tape 6 unwinds from its fully wound condition and supplies the stored addresses in sequence to the memory M2 and also the corresponding pulses which are recorded with the addresses. These pulses are supplied to the position counter 11 to advance the counter as a function of the positions of the alphanumerical addresses sequentially registered in the memory M2.

The coincidence circuit 12 continuously scans the content of the memories M1 and M2. At equality, i.e. when the displayed address corresponds to the address read from the magnetic tape, a pulse D is set up at output 12a of the circuit 12 and is passed to the magnetic recorder 5 to stop its tape 6 and to a gate arrangement 21 for the transfer of the content of the counter 11 into the memory M3.

At this instant, the actual search for the document on the microfilm 4 can commence.

In order to improve the precision of the search, use is made of the two speeds of the reader 1 to slow down the film reader 1 before it completely stops. The number *a* of frames to be travelled past between slowing-down and stopping is preset; for example it is experimentally determined as a compromise between precision and rapidity of search. The value of *a* is preset by presetting means 22 of comparator 13.

Let N be the position of the frame just scanned, which value N is indicated by the content of the forward-and-backward counter 3, and let N' be the position of the frame to be found, which value N' is contained in the memory M3 at the beginning of the search.

Four cases are possible and will be analysed by the control circuit 2. These are:

$N' - N > a$ i.e. $|N - N'| > a$ and $N' > N$ → fast forward (AR)

$0N' - N < a$ $|N - N'| < a$ and $N' > N$ → slow forward (AL)

$0 < N - N' < a$ $|N - N'| < a$ and $N > N'$ → slow reverse (RL)

$N - N' > a$ $|N - N'| < a$ and $N > N'$ → fast reverse (RR).

This control circuit 2 receives it information from two sources:

the comparator 14 which determines the information:

$$N = N', N' > N , N' < N$$

to a precision of ± 1 unit; and
the comparator 13 which determines the information:

$$|N - N'| - a$$

to a precision of ± 5 units.

For example, if the case $(N' - N) > a$ is assumed to exist, the control circuit 2 gives the rapid advance order to input AR of the reader 1 and the forward-and-backward counter 3 associated with the film reader 1 is changed over to the forward counting condition by a signal on line 23 and advances by one unit at each frame.

When the reader reaches the frame of order N″, such that $N' - N'' = a$, a slow advance signal is set up, which is produced on the basis of information from the comparator 13, and this signal produces the slowing-down of the film 4 via input AL.

Stopping is produced by a signal from the comparator 14 producing a stop signal on line 19 via the circuit 2. The pilot lamp 7*e* then indicates that the frame is in position, and a fast rewinding signal is produced in the recorder 5. When the latter reaches the beginning of the tape, a return-to-zero signal Z2 is emitted to reset the counter 11.

On the other hand, the microfilm 4 remains in the position in which it is now situated, as its position is registered in counter 3 and as searching can be effected in either direction. Thus, it is not necessary to return it to any initial position in order to effect a further document search.

We claim:

1. Apparatus for locating frames of a film, the apparatus comprising:
- a film reader having means for driving a film;
- sensing means for sensing the position of said frames of said film as said film is driven;
- a magnetic recording reader operable independent of said film reader and adapted to receive a magnetic recording medium; said medium having recorded thereon a plurality of words corresponding to respective ones of said frames to be located and position data associated with each said word defining the position of said frames identified by said words, said position data also being recorded on said medium;
- searching means operably connected to said magnetic recording reader for searching said medium in said magnetic recording reader to find a word corresponding to a frame to be located;
- comparison means operably connected to said searching means and said sensing means for comparing position data read from said medium which corresponds to said word found be said searching means with the frame position as sensed by said sensing means and for providing a signal representative of the conditions compared; and
- means for controlling the film driving means in said film reader, said controlling means being connected to said film reader and said comparison means and acting to terminate film displacement in said film reader upon the occurrence of a signal representing a favorable comparison when said sensing means senses a position corresponding to the position data associated with said word found on said medium of said magnetic recording reader.

2. The apparatus according to claim 1 wherein said means for driving a film may selectively drive said film in first and second directions and said means for controlling further acts to enable said means for driving a film to drive film in one of said first and second directions depending upon the results of comparisons conducted.

3. The apparatus according to claim 1 wherein said means for driving a film may selectively drive a film at first and second speeds and said means for controlling further acts to enable said means for driving a film to displace film at a first speed when the result of a comparison exceeds a given value and at a second, slower speed when the results of said comparison fails to exceed said given value.

4. The apparatus according to claim 2 wherein said comparison means comprises a first comparator for determining the magnitude of the difference between compared positions and a second comparator for determining the direction for reducing said difference, said first and second comparator means each being connected in parallel to said searching means and said sensing means and applying an output to said means for controlling said film driving means, said means for controlling enabling said film driving means to cause a displacement of film at a rate dependent upon said output of said first comparator and in a direction dependent upon an output of said second comparator.

5. The apparatus according to claim 1 wherein said sensng means comprises a pickup device maintained in contact with said film and adapted to emit pulses in synchronism with the driving of said film and a forward-backward counter connected to count said pulses and deliver the counting result to said comparison means.

6. The apparatus according to claim 5 wherein said recording medium reader additionally acts as a recorder for recording both said words and said position data, said forward-backward counter being connected to supply said medium reader and recorder with said position data for recording with said words when said medium reader and recorder is operable as a recorder.

7. Apparatus as claimed in claim 6, wherein the medium is tape.

8. The apparatus according to claim 1 wherein said recording medium reader additionally acts as a recorder for recording both said words and said position data and is connected to said sensing means to receive therefrom said position data for recording in association with the corresponding words when said recording medium reader and recorder is operable as a recorder.

9. An appartus as claimed in claim 8, wherein said sensing means comprises a pulse generator for emitting pulses in step with the driving of the film and said position data consists of a record of said pulses.

10. The apparatus according to claim 9 additionally comprising means connected to said medium reader and recorder for defining words to be recorded or located, said means for defining including an alphanumeric keyboard by which said words to be recorded and found are generated and introduced into said apparatus.

11. The apparatus according to claim 9 additionally comprising means connected to said medium reader and recorder for defining words to be recorded and located, said means for defining including input means for designating words to be recorded and words to be found and a first memory for storing a designated word to be found by said searching means, said first memory being connected as an input to said medium reader and recorder and said input means being connected as an input to said first memory.

12. The apparatus according to claim 11 wherein said searching means includes a second memory coupled to receive words read by said medium reader and a coincidence circuit coupled to compare the contents of said first and second memories, said coincidence circuit having an output for delivering an output signal upon a correspondence of the contents of said first and second memories.

13. The apparatus according to claim 12 wherein said searching means includes counting means for storing position data read from said medium and a third memory coupled to said counting means, said third memory receiving the state of said counting means when said coincidence circuit delivers said output signal, said comparison means being connected to receive the content of said third memory.

14. The apparatus according to claim 13 additionally comprising means for applying an output of said coincidence circuit to said medium reader for stopping the drive of said medium when said coincidence circuit delivers said output signal.

15. An apparatus as claimed in claim 14, wherein the input means comprises an alphanumeric keyboard.

16. The apparatus according to claim 15 additionally comprising a visual display connected to said first memory for displaying the content thereof.

17. The apparatus according to claim 14 wherein said comparison means comprises a first comparator for determining when the difference between compared positions has a magnitude less than a predetermined value and a second comparator for determining the polarity of said difference, said first and second comparator means each being connected in parallel to said third memory and said sensing means and applying an output to said means for controlling said film driving means, said output of said first comparator means causing a reduction in the drive speed of said film when said difference between compared positions has a magnitude less than said predetermined value and said output of said second comparator means controlling the direction and stopping of the displacement of said film.

18. An apparatus as claimed in claim 14, wherein the medium is a tape.

19. Apparatus for preparing a magnetic recording medium for use in accessing frames of a film, the apparatus comprising:

- a film reader including means for driving a film having frames to be accessed;
- sensing means for sensing the displacement of said frames of said film as said film is driven and providing an output representative of the displacement thereof;
- a magnetic recording device for receiving a magnetic recording medium and for driving said magnetic recording medium;
- input means for defining addresses corresponding to the respective ones of said frames of said film to be accessed and applying said addresses to said magnetic recording device for recording upon said magnetic recording medium;
- means responsive to said sensing means for supplying to said magnetic recording device for recording on said magnetic recording medium position data defining the present position of film being driven; and
- means at said magnetic recording device responsive to the application of an address corresponding to a frame to be accessed for recording on said magnetic recording medium said address in association with the position data provided to said magnetic recording medium defining the present position of said film whereupon each address recorded on said magnetic recording medium corresponds to a defined frame of film and is recorded with position information detailing the location of said frame on film loaded in said film reader means.

20. An apparatus as claimed in claim 19, wherein said sensing means comprises a pulse generator for emitting pulses in step with the driving of the film and said position data consists of a record of said pulses.

21. An apparatus as claimed claim 20 wherein said input means includes an alphanumeric keyboard for defining addresses to be recorded and introduced into said apparatus.

22. An apparatus as claimed in claim 21 wherein the medium is a tape.

23. An apparatus as claimed in claim 18 wherein said sensing means comprises a pickup device maintained in contact with said film and adapted to emit pulses in synchronism with the driving of said film and said means responsive comprises a forward-backward counter connected to count said pulses and supply the counting result to said magnetic recording device.

* * * * *